US005275678A

United States Patent [19]

West et al.

[11] Patent Number: 5,275,678

[45] Date of Patent: Jan. 4, 1994

[54] METHOD OF UTILIZING SURFACE TENSION OF WATER TO TRANSFER LABELS ONTO CONTAINERS IN AUTOMATIC HIGH-SPEED LABELING MACHINES

[76] Inventors: Michael J. West; Jimmy D. Williamson, both of 1465 Ellerd Dr., Turlock, Calif. 95380

[21] Appl. No.: 912,729

[22] Filed: Jul. 13, 1992

[51] Int. Cl.[5] .............................................. B32B 31/00

[52] U.S. Cl. .................................... 156/215; 156/281; 156/306.3; 156/308.8; 156/390; 156/447; 156/568; 156/DIG. 35; 521/40; 521/48

[58] Field of Search ............... 156/215, 390, 281, 447, 156/306.3, 308.8, DIG.; 521/40, 48

[56] References Cited

U.S. PATENT DOCUMENTS 3,508,993 4/1970 Belcher et al. ..................... 156/215
3,859,156 1/1975 Yazawa et al. ..................... 156/265
3,869,329 3/1975 Schweltzer, Jr. .
4,225,369 9/1980 Felchin ............................ 156/306.3
4,574,020 3/1986 Fosnaught .
4,605,454 8/1986 Sayovitz .
5,082,520 1/1992 West .

*Primary Examiner*—John J. Gallagher
*Attorney, Agent, or Firm*—Basil Travis

[57] ABSTRACT

A method is disclosed whereby water is used to transfer labels onto containers in automatic high-speed labeling machines thereby leaving no glue residue on a container's surface, and making them amenable for recycling. The method further provides for adjustment of water's surface tension if necessary by surfactants to cause wettability of a variety of surfaces undergoing labeling, but said label is permanently attached to the container by friction, rather than by glue, after evaporation of the water.

6 Claims, 2 Drawing Sheets

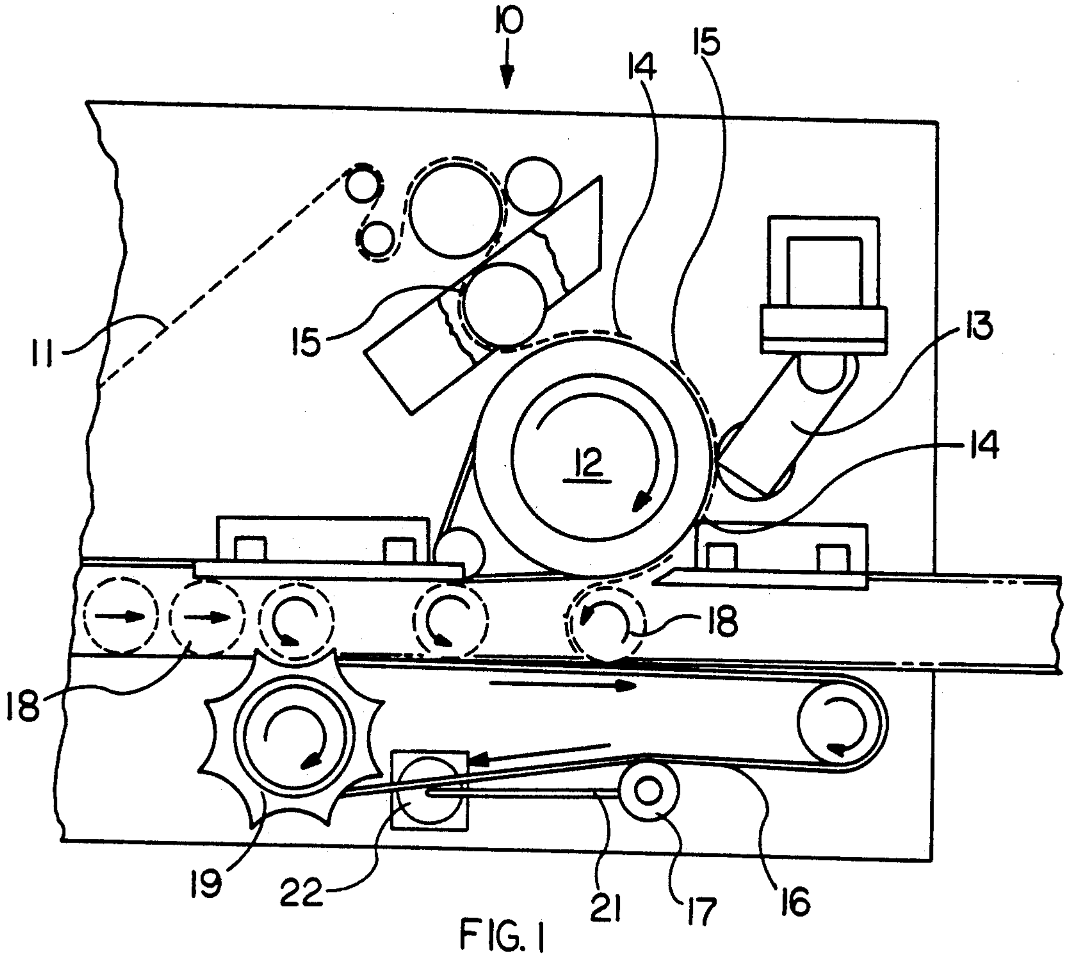
FIG. 1
FIG. 2
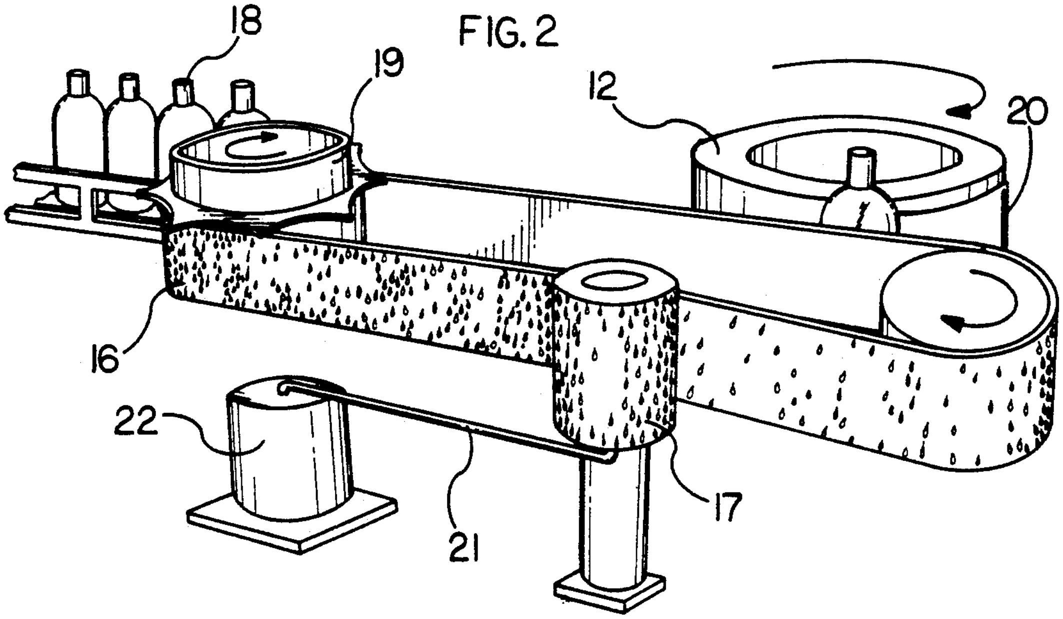

METHOD OF UTILIZING SURFACE TENSION OF WATER TO TRANSFER LABELS ONTO CONTAINERS IN AUTOMATIC HIGH-SPEED LABELING MACHINES

BACKGROUND OF THE INVENTION

1. Field of Invention

The present invention generally relates to automatic high-speed labeling machines and a method they may utilize to transfer labels onto containers without depositing a glue residue on the containers.

More particularly, the present invention pertains to a method or process for transferring labels to containers by utilizing the surface tension of water, rather than by glue as is customarily done, and thereby eliminating any glue residue on the surface of said container.

Even more specifically, the present invention concerns a method for applying a thin uniform coating of water, with or without a surfactant, onto the surface of containers in high-speed labeling machines so that tangential contact between a leading edge of each pre-cut label on a label transport means will cause said label to transfer to the surface of said container by surface tension of water alone and thereby cause said label to be lifted from said transport means, wrapped around said container and subsequently glued to itself rather than to the container, but being held thereon by friction after evaporation of the water.

2. Discussion of the Prior Art

It has been estimated that Americans generate more than one billion pounds of plastic waste annually. More than 870 million pounds are from plastic soft drink containers and, although these bottles are recyclable, 80 percent are estimated to be buried in landfills.

Virtually all plastic soda bottles and bottles for many other products such as mouthwash, liquor, cooking oil, juice, etc., are made from polyethylene terephthalate or PET. The typical clear plastic PET bottles also has a cap made from aluminum or polyethylene and in many cases a label is connected to the PET bottle with ethylene vinyl acetate (EVA) or other hot-melt glues. Therein lies the problem for recyclers.

In common recycling processes the whole plastic bottle is ground, sent through a stream of air to separate dirt and fine particles, washed vigorously and then separated into several streams of useful products including PET granules, polyethylene granules and aluminum chips, shredded paper and other contaminants such as glue. Recovered PET granules can be resold for moulding new, clear plastic bottles provided there are no contaminates present, such as glue which can discolor the appearance and limit its use for other applications where appearance does not matter.

Because glue residue on plastic containers represents one of the greatest obstacles to rapid recycling, there is a demonstrative need for a method adaptable to conventional labeling operations which produces a container surface free of glue residue.

In this regard, several inventions in the prior art have addressed this problem and a few have also employed water in an adhesive process, but none have utilized the surface tension of water in labeling operations.

For example, in U.S. Pat. No. 4,574,020 (1986), Fosnaught discloses an apparatus and method for wrapping a plastic label around a container without leaving a glue residue thereon. His method employs a solvent, such as methylene chloride, which when applied to a leading edge of a polymer backing on a film label produces an instant but temporary tacky liquid, but only momentarily while in tangential contact with a container, thereby providing the adhesive necessary to lift said label from a transport means onto a container and thereby further allowing said container to literally wrap the label around itself. Since the film labels of Fosnaught's invention contain a layer of foam polystyrene, the trailing edge, being of sufficient length to overlap the leading edge, is also treated with the solvent in order to bond the label unto itself.

Although Fosnaught's patent also speaks of a liquid recovery system for the solvent, it does not address containment nor recovery of solvent vapors, which by necessity of his invention must evaporate. Thus, it can be easily seen that in a high-speed labeling operation, say 400 containers per minute, a substantial amount of volatile solvent will be released into the atmosphere, and perhaps even into the containers themselves, thereby posing very serious environmental and health concerns, especially with methylene chloride.

By contrast, the present invention employs water either by itself or in conjunction with very slight traces of surfactant, such as ammonia, to wet the entire surface area of a container prior to contacting a leading edge of a label so that the surface tension of water alone is sufficient to lift and remove said label from an ordinary transport means and wrap it around the container. Glue still needs to be applied to a label's trailing edge which overlaps it leading edge for a permanent adhesive bond: however the water simply evaporates. Therefore, it may be easily seen that one major advantage of the present method is that it can be adapted to a variety of present labeling machines by simple substitution of a water application means, such as a water wheel, in place of a primary glue application means while maintaining any secondary gluing means for a label's trailing edge.

There are also a few other methods in the prior art that employ water as an intermediary step in bonding processes which should be further distinguished from the present invention.

In U.S. Pat. No. 3,869,329 (1975), Schweltzer, Jr. and Schupak disclose a method of sealing nylon film using boiling water or steam to bond together surfaces of very thin nylon film without the application of pressure, wherein the surfaces of said film are exposed to the water as the only adhering solvent. Although temperature is known to affect surface tension, the present invention does not require elevated temperatures of water to cause a label transfer onto common containers because such transfer is easily accomplished at room temperature wherein most labeling operations occur, however the present method may also require employment of elevated temperatures of water in labeling operations where wettability need be enhanced between unusual materials. Moreover, the Schweltzer invention should be further distinguished as providing a bonding together of like surfaces, while the present invention is particularly applicable to unlike surfaces, such as polyethylene film labels to polyester containers, or, for that matter, paper onto glass.

In U.S. Pat. No. 4,605,454 (1986), Sayovitz, et. al., describes a method of ultrasonically bonding nonwoven webs by employing water to form web laminates, such as plastic polymeric webs for tents and the like. His patent is mentioned because of its spray application of a generally uniform coating of water prior to contacting component layers for bonding, while further recognizing that other liquids, such as alcohols or mixtures of alcohol and water may very well need be used depending on the nature of materials being laminated.

The same principle may be true in labeling operations, and because of the diverse nature of materials that undergo labeling, surface tension of water may very well need to be slightly adjusted to enhance wettability in some situations. Therefore, such surface tension enhancement by surfactants and temperature elevation may be employed in labeling machines generally used by those skilled in the art to label a variety of containers and, accordingly, should be considered within the scope and spirit of our method.

For example, it has long been known that the ability of a liquid to wet a solid surface depends largely on the surface tension of the liquid which is often defined as the force acting in the surface of a liquid tending to minimize to area of the surface produced by internal forces within the liquid. Most liquids have surface tensions of 20–40 dynes/cm, but water has the exceptionally high value of 72.75 dynes/cm at 20 degrees centigrade due to its molecular polarity or internal cohesive forces which also affects its wettability on various surfaces.

Because wettability of a surface is also a reason for label transfer to a surface of a container, it is important to understand that the wetting or non-wetting ability of a liquid depends on the chemical composition of the surface and is often shown and expressed by a contact angle between a solid surface and a droplet of liquid, as measured through the droplet, where the liquid is said to wet a solid if the contact angle lies between 0 and 90 degrees and not wet the solid when the contact angle lies between 90 and 180 degrees. In other words, the more a liquid spreads out on a surface the more it is said to wet that surface. This phenomenon is easily seen in the waterproofing of surfaces which would otherwise be pervious to water but by proper application of a surface film causes water droplets to form beads with a contact angle of more than 90 degrees.

When a surfactant, such as a detergent, is added into a liquid the surface tension of the liquid is generally lowered thereby increasing its wettability, and since surfactants are mainly composed of molecules containing both a polar (hydrophilic) and non-polar (hydrophobic) group, the result is orientation of the greater concentration of surfactant in the interface phase rather than in the bulk of the liquid. Moreover, surfactants are commonly classified as anionic, cationic and non-ionic. In anionic surfactants, such as detergents, the hydrophilic group is a polar negatively charged ion like carboxylate, sulfate or phosphate. In cationic surfactants the hydrophilic group is most often quaternary nitrogen and in non-ionic surfactants attraction between one end of the molecule and the polar liquid is caused by hydrogen bonding such as with alcohols.

The foregoing discussion is relevant to the mechanics of label transfer to a container utilizing water in automatic high-speed labeling machines because not all containers not labels are made from the same solid materials. For example, PET containers are polyesters which contain polar groups while their popular film labels are plastic polyethyenes which contain non-polar groups. Therefore, the surface tension of water utilized to transfer a label onto a container may very well need to be adjusted by a surfactant so that wettability by the water is sufficient enough to wet both surfaces, but yet at the same time maintain the maximum internal cohesive forces of the liquid so that it will not pull apart during high-speed labeling operations.

The utilization of water is particularly well suited for labeling cylindrical containers in so-called "straight-through" labeling machines, but of course may also be easily adopted by other types of those machines where there is a need to eliminate glue residues on a container's surface. An example follows.

In our recent U.S. Pat. No. 5,082,520 (1992) entitled "Automatic High-Speed Labeling Machine Employing Various Linear and Rotational Speeds of The Container," we disclosed a labeling machine which propels containers linearly and upright but while also causing them to rapidly rotate counterclockwise around their vertical axes by a set of parallel upper and lower bottle spinning belts traveling clockwise but in slightly slower partial parallel cooperation with a container drive belt to place the container in brief tangential contact with a label transport wheel. It is this type of a machine that is particularly well suited by only slight modification for the practice of our method because the machine is of the type which employs a container drive belt to laterally contact and propel said containers both lineraly and rotationally past a label transfer means for label transfer. Thus, these machines are easily modified by installation of a water application means preferably in combination with a container drive belt so that a uniform film of water coating is applied to each container prior to contacting a label. Furthermore, machines of this type can be also easily adjusted for proper placement of glue on a trailing, rather than a leading edge, of a label.

Accordingly, it is a general object of the present invention to provide a method of utilizing water to transfer labels onto containers in automatic high-speed labeling machines, thereby eliminating glue residues on the containers.

It is another object of the present invention to provide a method and apparatus whereby a thin film of water, either by itself or containing surfactants, uniformly covers the surface of a container to produce the requisite surface tension which is necessary to transfer a label onto a container in a manner that a label's trailing edge, containing glue, will overlap its leading edge thereby being adhesively bonded to itself rather than onto said container, after which the water naturally evaporates to leave virtually no residue.

There objects are achieved by the present invention.

SUMMARY OF THE INVENTION

In accordance with the present invention, a method is provided for application of a thin but uniform coating of water, either with or without a surfactant, over a container's surface prior to labeling as it travels through a labeling machine, so that surface tension of water alone is sufficient to transfer a label onto the container whereupon an overlapping portion of the label may be glued to itself by a variety of commonly known means, thereby eliminating any glue residue on a container's surface after evaporation of the water.

A water applicator means may be installed in a variety of common labeling machines for either direct or indirect application of water to containers, however such application may also be accomplished by spray or dipping. Although in most cases water alone provides sufficient surface tension to affect label transfer, a slight amount of common surfactants, preferably ammonia, may be required to adjust the surface tension of water to produce wettability of a variety of contacting surfaces commonly encountered in labeling operations.

The major advantage of the present invention over the prior art is elimination of volatile and toxic solvents, such as methylene chloride, while producing a container free of glue residue and amenable for recycling.

BRIEF DESCRIPTIONS OF THE DRAWINGS

FIG. 1 is a simplified and partial top plan view illustrating the essential elements of a typical labeling machine, such as disclosed in our U.S. Pat. No. 5,082,520 (1992), which is shown modified to practice the method of the present invention.

FIG. 2 is a perspective view of FIG. 1 illustrating a preferred positioning of a water applicator wheel.

DETAILED DESCRIPTION OF THE PREFERRED EMBODIMENT

Figure 3:
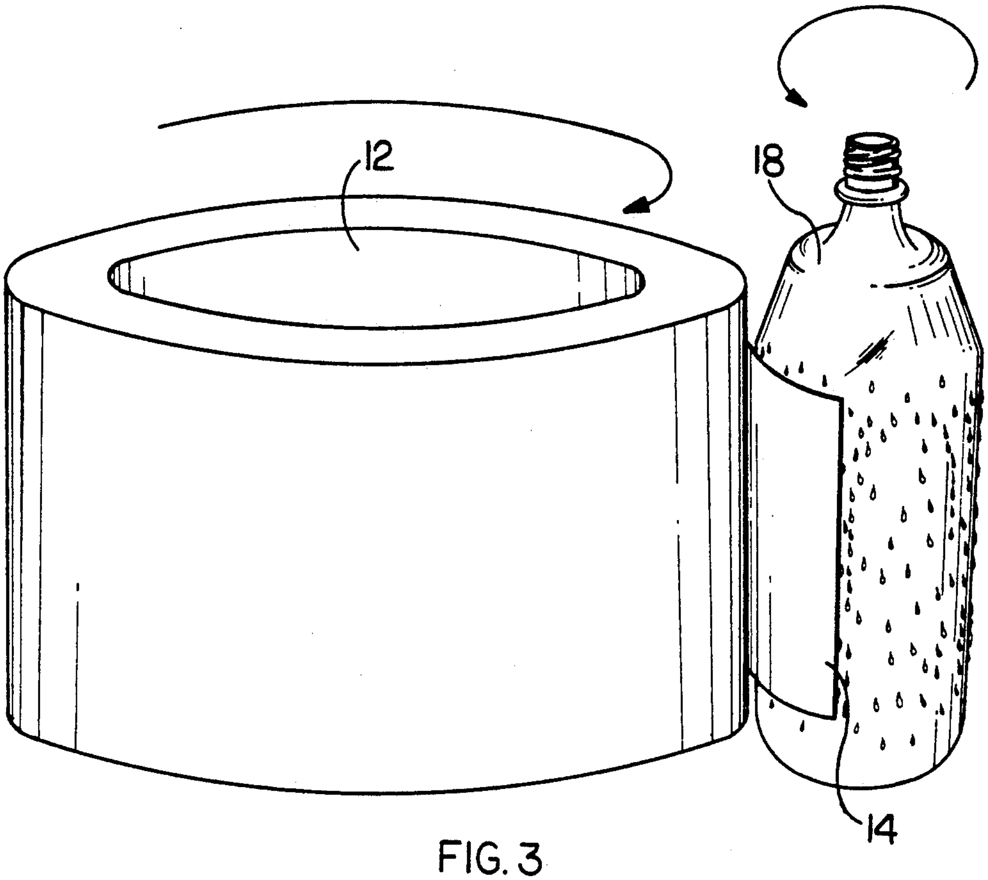
FIG. 3 illustrates a wet container lifting a label from a typical label transport means by surface tension of water.

Turning now to the drawings, FIG. 1 illustrates essential elements of a typical automatic high-speed labeling machine, designated by reference numeral 10, and which generally provides a continuous strip 11 of plastic film or paper labels through various components of the machine until an individual label is deposited on a label transporting means 12. A standard glue application means 13 may usually be adjusted to apply glue to various locations on said label, such as a leading edge 14, a trailing edge 15, or both. Therefore, at the outset, it should be recognized that both label length and application of glue thereon are adjustable variables in virtually all such known labeling machines so that no specific claim shall be made thereto apart from our herein described method.

Furthermore, it should be pointed out that the prior art is replete with various types and designs of labeling machines which accommodate different shapes and sizes of containers, both filled and unfilled, while propelling them by a variety of means to effect label transfer, so it should be understood that our new method is also applicable to those machines with slight modification by those skilled in the art.

However, in this preferred embodiment, our method is further described in relationship to those types of automatic high-speed labeling machines which employ a container drive belt 16 (FIG. 1) in communication with a water applicator means 17, so that a propelling means itself is employed to apply water to a container's surface, but it should be emphasized that other water application means may just have easily been illustrated.

Referring again to FIG. 1, there are illustrated a plurality of cylindrical containers 18 entering a high-speed labeling machine 10 and contacting a synchronization means 19 for timed release into a container drive belt 16 which laterally engages the containers 18 thereby causing them to rotate as they are linearly advanced through the machine 10. A water application means 17 in communication with said container drive belt 16 provides a means of applying a thin but uniform coating of water, with or without surfactant, onto a container's surface as it is rolled around its vertical axis while approaching a label transport means 12, to that at a point of tangential contact, said container 18 is enabled to lift a label's leading edge 14 from said transport means 12 by only surface tension of the water.

FIG. 2 more clearly illustrates an application of our method in a perspective view showing a water applicator wheel 17 as a means for providing water to a container drive belt 16 which also propels containers 18 past a label transport means 12. In this particular modification, said water applicator means 17 comprises a circular fabric roller mounted on the frame of a machine 10 and extending by an arm 21 to tangentially contact said belt 16. When such an extending arm 21 is hollow it may also be used as a fountain for providing water onto said fabric roller of the water applicator means 17 by merely connecting a distal end of said arm to a reservoir 22 where surfactants may be added if and only when necessary.

In other types of machines a water applicator means may simply comprise a nozzle (not illustrated) mounted in a similar fashion at the position and in place of said wheel means 17. But in either alternative, the important inventive step in our method is believed to be an application of water to surfaces of containers 18 by whatever means prior to contact with a label transport means 12 to effect a label transfer by surface tension of water rather than by glue.

FIG. 3 illustrates such a transfer. Although somewhat exaggerated, a container 18 is depicted in tangential contact with a label transport wheel 12 means at a brief moment of label transfer caused by surface tension provided by water droplets illustrated on a container's surface in contact with a leading edge of a label 14. As it can be seen in FIG. 4, a strip of glue 20, previously applied by a glue applicator 13, is provided on a trailing edge 15, rather than on a customary leading edge 14, of the label thereby resulting in transfer of said label to a container 18 by surface tension of water alone, which is believed to distinguish this invention from the prior art.

Figure 4:
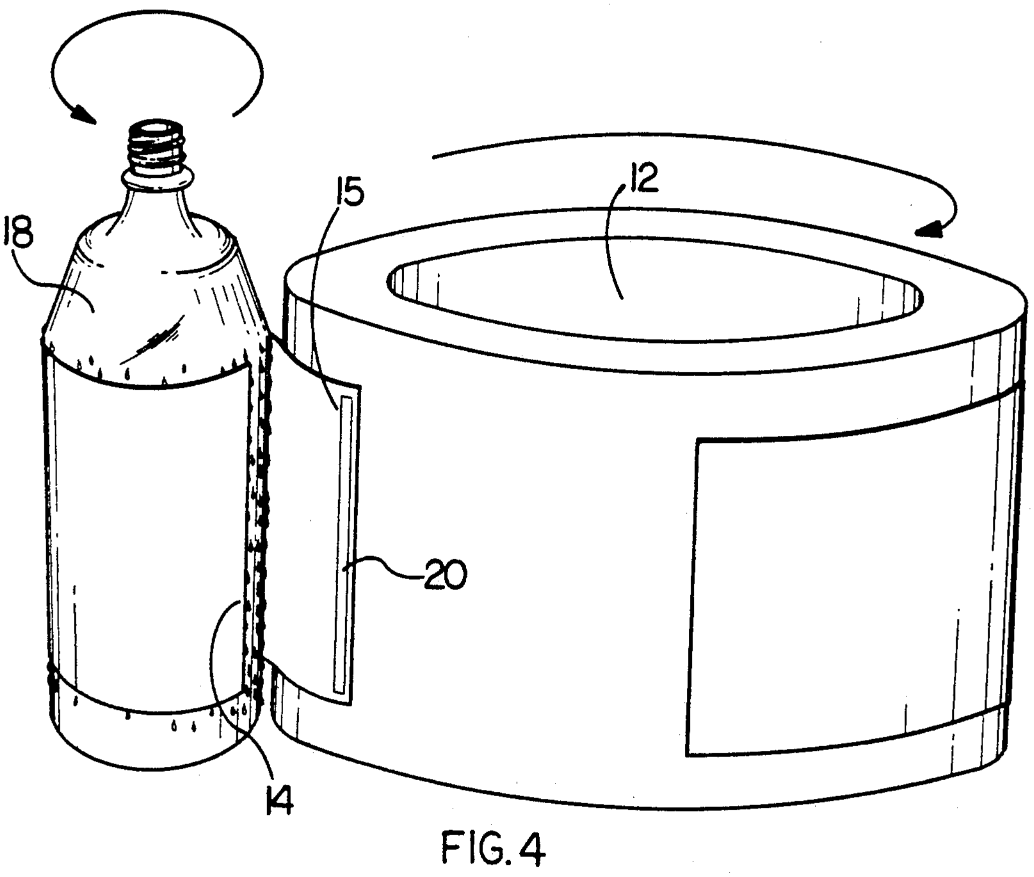
FIG. 4 illustrates gluing a label's trailing edge from as viewed from the opposite side as shown in FIG. 3.

As the container 18 continues to spin as shown in FIG. 4, a label's trailing edge 15 is wrapped around its leading edge 14 for a permanent adhesive bond thereto, and the water accordingly and naturally being evaporated into the atmosphere leaving virtually no residue on the container, said label being held thereon by friction.

Having described our method, we claim:

1. A method of utilizing surface tension of water to transfer labels onto plastic containers in automatic high-speed labeling machines, said method comprising the following steps:

(a) propelling plastic containers in a labeling machine while causing them to rotate around their vertical axes;

(b) applying a thin but uniform coating of water onto a container's surface;

(c) providing a length of label slightly longer that a circumference of the container;

(d) contacting the rotating container with the leading edge of the label;

(e) transferring said label to the container by surface tension of water;

(f) wrapping the label around the container by rotating the container;

(g) bonding the trailing edge onto the leading edge of the label by glue.

2. The method of claim 1 wherein water is applied to a container by contacting it with a drive belt in communication with a water applicator means.

3. The method of claim 1 wherein water contains a anionic surfactant.

4. The method of claim 1 wherein water contains a cationic surfactant.

5. The method of claim 1 wherein the water contains a non-ionic surfactant.

6. The method of claim 1 wherein the water contains ammonia.

* * * * *